John H. Thomas
Ed Fletcher
INVENTORS

BY Rule & Hoge
ATTORNEYS.

July 11, 1939.                J. H. THOMAS ET AL                2,165,318
                       APPARATUS FOR FEEDING MOLTEN GLASS
                          Filed Dec. 26, 1935        2 Sheets-Sheet 2
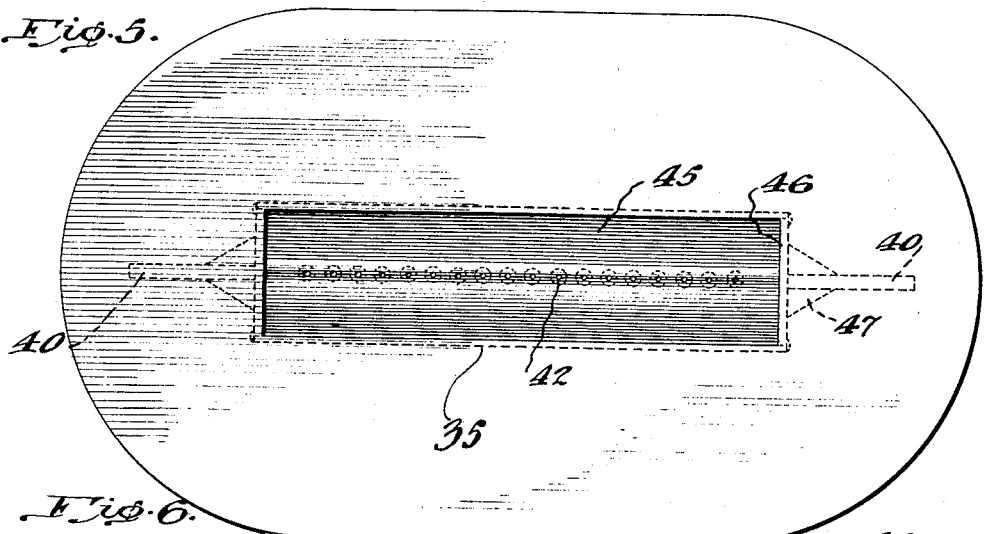
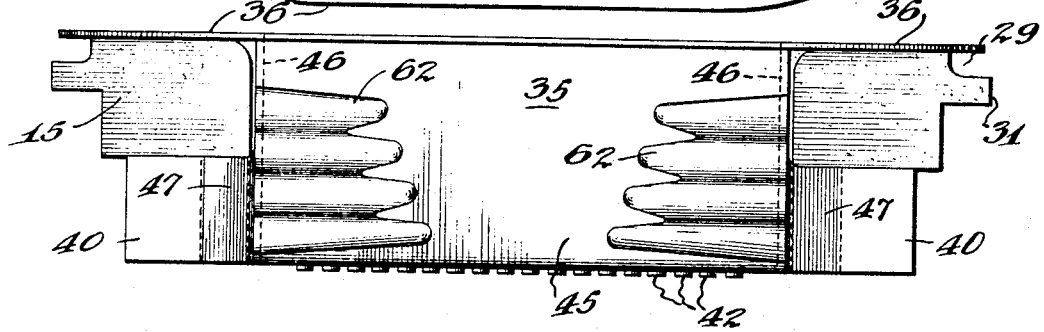
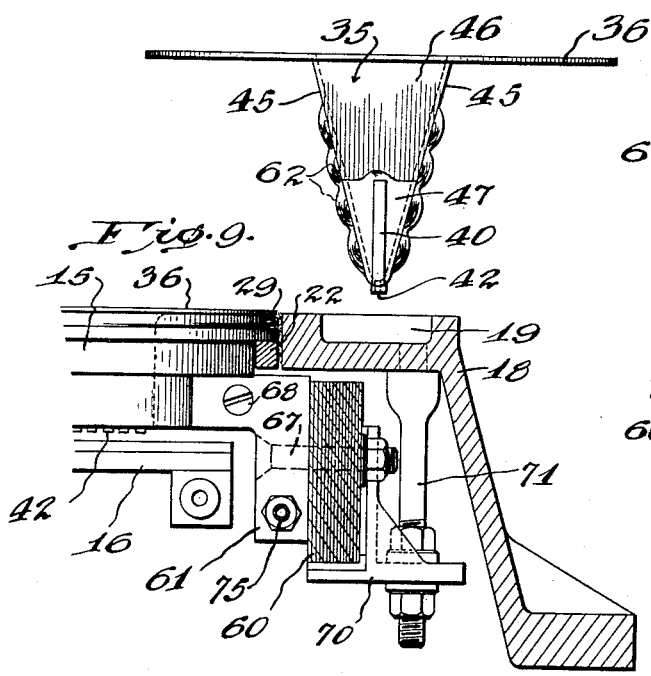
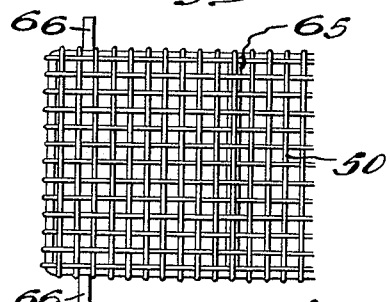
John H. Thomas
Ed Fletcher
INVENTORS
BY Rule & Hoge
ATTORNEYS.

Patented July 11, 1939

2,165,318

UNITED STATES PATENT OFFICE 2,165,318

APPARATUS FOR FEEDING MOLTEN GLASS

John H. Thomas and Ed Fletcher, Newark, Ohio, assignors, by mesne assignments, to Owens-Corning Fiberglas Corporation, a corporation of Delaware Application December 26, 1935, Serial No. 56,222

15 Claims. (Cl. 49—55)

The present invention relates to apparatus for reducing molten glass or like material to fine fibers and more particularly to an improved metal lined bushing adapted for such use.

It is an object of the present invention to provide a practical form of apparatus capable of an economical, commercial production by which a plurality of fine streams of molten glass may be projected into a drawing medium to produce fibres having great fineness, flexibility, tensile strength, resistance to breaking or shattering and other desirable characteristics.

It is another object of the present invention to provide a metal alloy cap or lining for a refractory bushing which is not injuriously affected to any extent by the molten glass and which retains its strength at high operating temperatures.

It is a further object of the invention to provide an alloy lining for a refractory bushing which allows glass to slide easily over its surface without sticking, accumulating or being held back by frictional resistance. Our alloy composition has been found to offer great resistance to abrasion and wear so that accurate shapes and sizes may be maintained over long periods of time and yet is sufficiently ductile to allow the forming of small, very accurately shaped nozzles or tips of predetermined sizes to deliver from the bushings constantly accurate streams of glass which flow independently from each other so as not to run together.

It is also within the contemplation of the invention to provide a bushing having a streamline shape which permits a greater bulk of molten glass with its inherent heat to extend right down to the actual openings or nipples so as to prevent a chill condition and utilize the full cross-sectional area of the outlet openings for the stream flow.

Another object is to distribute the heat uniformly throughout the length of the bushing and project all the streams of glass into the drawing medium at the same temperature by distributing the metal alloy in the walls of the lining commensurate with the current density.

A further purpose of the invention is to provide means for removably attaching our bushing to the lower portion of a forehearth or container for molten glass without causing leakage or seepage of the glass between the metal lining and the adjoining refractory walls. Heretofore, as a practical matter, great difficulty has been encountered in preventing such leakage or seepage around electrically heated metal linings. Our invention overcomes this difficulty by providing novel, regulable cooling means surrounding the outer edge of the bushing to cause a localized freezing action which does not interfere with the operation of the electrically heated liner.

Still further objects of the present invention are to provide screening means to prevent stones and other foreign matter from entering the liner or orifices, and to provide electrical heating means which are simple in design and easy to assemble.

Other objects and advantages of the present invention will become apparent from the following description taken in conjunction with the drawings, in which:

Fig. 5 depicts a top plan view of our improved metal liner;

Fig. 6 is a side elevational view of the liner having assembled therebehind one half-section of a refractory bushing;

Fig. 7 is an end elevational view of the alloy liner;

Fig. 8 is a fragmentary plan view of a screen for the alloy liner; and

Fig. 9 is a fragmentary assembly view in part sectional elevation, showing the bushing, the electrical contact means and means for mounting the same to the framework or structure of the furnace.

Figure 1:
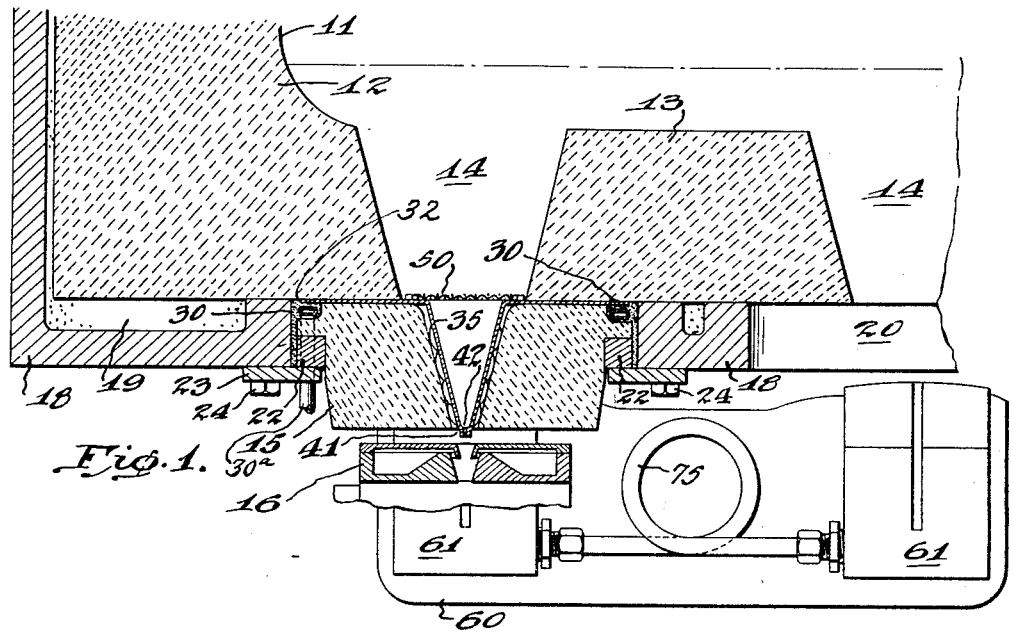
Fig. 1 is a cross sectional assembly view of a glass furnace having our improved bushing and electrical contact means mounted thereunder.

Referring more particularly to Fig. 1, glass batch or the like is continually fed to and melted in a furnace tank which leads to a conventional forehearth 11 having the usual walls 12 and floor 13 of suitable refractory material. A plurality of openings or wells 14 are provided for the bushings 15, in which a constant head of molten glass is maintained. The molten glass is projected downwardly through orifices or nipples 42 at the bottom of the liner 35 and between the jets on the blowers 16 which draw the glass into fine attenuated fibers.

The forehearth 11 is supported by the framework or structure 18 which preferably has recesses 19 therein filled with a suitable insulation or packing such as silocel. Beneath each well 14 are openings 20 in the framework 18 which are adapted to receive our improved bushings 15, fitting flush with the floor 13 of the forehearth and in register with the wells 14. Each bushing is supported and held in place by a metal clamp ring 22 which is fixed in position by means of metal clamps 23 and bolts 24 screwed into the under portion of the framework.

Figure 2:
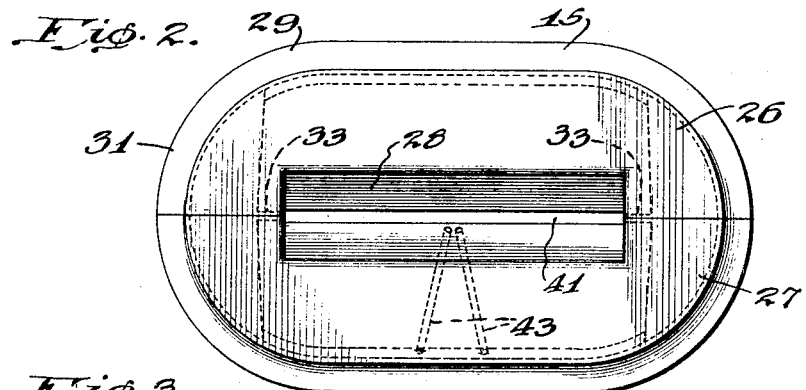
Fig. 2 is a top plan view of the refractory sections of our bushing.
Figure 3:
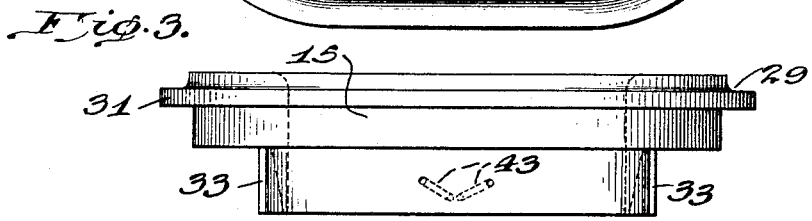
Fig. 3 is an elevational side view of the refractory bushing shown in Fig. 2.
Figure 4:
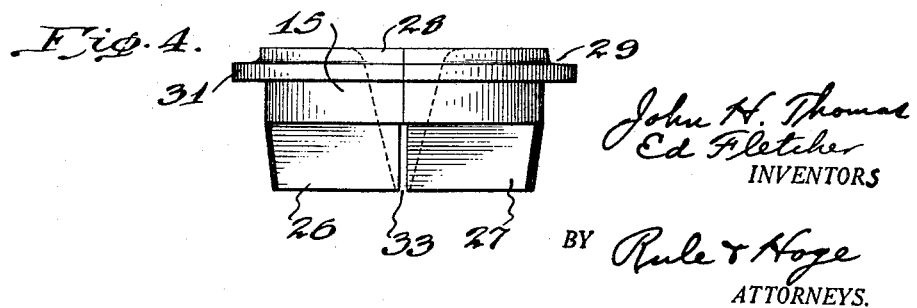
Fig. 4 is an elevational end view of the same.

The preferred form of my refractory bushing may be seen by reference to Figs. 2, 3 and 4. In order to facilitate assembly of the bushing and the metal liner, the refractory bushing is formed in two identical half-sections of refractory blocks 26 and 27, respectively, which, when placed together as is shown in Fig. 2, form a V-shaped trough therebetween. The periphery of the refractory bushing is preferably oval in shape, having an annular recess 29 around the upper edge adapted to receive a cooling pipe 30 (Fig. 1). An outer flange 31 forms a peripheral ledge which overlies and is supported by the metal clamp ring 22. At each end of the refractory bushing extending from the trough 28 are openings or kerfs 33 which are adapted to receive the lugs or extensions 40 of the metal liner 35 more fully described hereinafter. The walls of the trough 28 are tapered downwardly and terminate in the slot 41 through which the nozzles or nipples 42 of the metal liner project for a short distance. Openings 43 in the side walls of the refractory bushing lead to the alloy liner into which thermocouples or other suitable temperature measuring means may be inserted. As many of these openings may be provided at various places along the bushing sides as is desired.

Associated with the refractory bushing is a metal alloy liner 35 which constitutes a container for the molten glass to supply the flowing streams. The bushing liner is preferably made of an alloy composed of 90% platinum and 10% rhodium although these proportions may be varied, and platinum-iridium, platinum-gold and other high temperature elements and alloys may be used.

Heretofore the glass industry has hesitated in its use of platinum for lining bushings because it was the belief of those skilled in the art that platinum would be subject to attack by the glass. It was common knowledge that many of the glasses which were analyzed in the laboratory attacked the platinum crucible at elevated temperatures. We have found, however, that a platinum or platinum alloy liner could be successfully used by regulating the composition of the glass batch.

Pure platinum, while it has approximately the same melting point (3100° F.) as the platinum-rhodium alloy, does not retain its strength up to as near its melting point and in the range of present working temperatures as does the alloy. It has been found that the platinum-rhodium alloy at 2600° F., which is in the neighborhood of general working temperatures, has about the same strength and softness as lead at room temperature. If it is desired to work at still higher temperatures, an iridium alloy may be found more suitable. Platinum has the important quality which prevents molten glass from sticking to it and, provided there is an absence of certain impurities such as arsenic, sulphur and sodium chloride, the glass will have no tendency to attack, injure or disintegrate the platinum. This is due to the fact that the metal has a higher melting point than the temperatures at which the glass is ordinarily worked and due to the fact that platinum has no tendency to be oxidized. In view of the fact that refractories and glass are principally metal oxides or mixtures of metal oxides, the platinum has been found to be suitable for use in protecting the oxides in the refractories from being dissolved in the oxides composing the glass.

In Figs. 5 to 7, the platinum alloy liner is in the form of a streamline V-shaped trough having downwardly converging side walls 45, vertical end walls 46 and an upper marginal flange 36 which overlies and substantially covers the top surface of the refractory bushing 15. The converging walls 45 terminate at their lower end in a plurality of relatively small nipples 42, which are necessarily quite small to permit the glass to issue in the small streams required for making fine glass fibers. We have found in practice that the diameters of the outlets or nipples may range from .03" to .175", the exact size depending upon the diameter of fibers to be produced and other variable factors. These nipples 42 protrude slightly below the bottom face of the refractory block through the slot 41. With this construction the molten streams of glass which issue from the nipples are prevented from bridging across the openings and flowing together. Leading into each side of the end walls 46 in the lower portion are the lugs 40 which are formed with enlarged fillets 47 serving to reduce the electrical current density and distribute the electricity evenly at the juncture.

It is found that the streamline taper or flare of the side walls 45 has a material effect on the rate of flow of the glass. Too great a divergence of the side walls is objectionable as it results in a material reduction in the rate of flow and also unduly increases the area of the screen 50. If, on the other hand, the walls are too steep, the flow is also restricted and this restriction is further increased by the retarding action of the screen 50 due to its decreased area. By means of the streamline taper it is possible to maintain a continual body of hot molten glass near the outlet nipples 42 so that any chilling effects of the side walls of the liner would be minimized. If any frictional resistance or chilling effect is set up by the side walls, the divergence is sufficiently great so that the cross-sectional area of flow through the lining will not be restricted by the chilling. The addition of electric heating to the alloy bushing creates a condition wherein the effective outlet area is as near maximum as is possible to obtain. In this manner it is possible to provide a plurality of small outlet openings in close proximity to one another with outlet openings of a size substantially as great as the cross sectional area of flow without having the individual streams of molten glass run together in sheet form. The result is a material conservation of space and heating energy and the production of more uniform and better fibers. The best angle of taper in the side walls of the metal liner has been found to be from about 30° to 60° according to the size of the orifices at the nipples 42 and the particular type of fibers to be produced.

It is found that in attempting to electrically heat a metal bushing liner of the character above described by passing an electric current therethrough, if the metal walls are of a uniform thickness throughout, there is a substantial variation in the temperature at different points and particularly at the different outlets. The temperature is usually considerably higher in the area adjoining the bus-bars 60 and the connector bars 61 which are more fully described hereinafter. If the temperature is not uniform at all the nipples 42, the size and rate of stream flow and temperature of the glass issuing from the different outlets will vary. The temperature requirements permitting uniform fine glass fibers to be drawn are exacting; as satisfactory results can only be obtained within narrow limits as to temperature and viscosity of the issuing glass. In order to achieve a uniform temperature throughout the liner, the path of current flow is controlled by varying the thickness of each side wall 45 in accordance with the current density, and more particularly, by graduating the thickness of the side walls toward each end. The preferred method of obtaining this graduation consists in thickening the sheet metal walls with the electrical conducting elements 62 by which the electrical conductivity is increased and the current flow directed. These conductors or low resistance elements 62 are made preferably of wire consisting of the same metal or alloy as the walls of the feeder and may be welded in short strips or ribs to the walls 45. The strips 62 have been shown to be graduated and successively decreased in length from the lowermost upward in crow's-foot formation. With this arrangement the current flow is so directed that the greater portion of the heating takes place along the nipples 42. The tendency to overheat at the ends of the liner adjacent to the lugs 40 is overcome by increasing the thickness of the walls at these points.

Covering the top of the liner 35 is a screen 50 (Fig. 8) which is preferably made of the same alloy as the liner itself. The screen may be made of wire mesh as shown or a perforated plate or the like having openings sufficiently large to permit the free flow of liquid therethrough but small enough to hold back and filter out any stones or other foreign matter. Cross bars 65 may be provided underneath the screen to add strength thereto. Along the outer edge of the screen are ears 66 or the like to fasten the screen to the marginal flange 36 of the liner.

Electrical energy is supplied to the liner by means of the bus-bars 60 which, as shown in Fig. 9, are laminated and are clamped to the lugs 40 by means of connector bars 61. Bolts or studs 67 serve to fasten the connector bars rigidly to the bus-bars. In order to form a more perfect contact with the lugs 40 each connector bar is bifurcated to receive a lug 40 and is clamped tightly thereto by means of a screw 68. The bus-bar 60 preferably consists of a plurality of copper laminations which allow a certain amount of expansion and contraction due to various thermal and other stresses which may be set up. A bracket 70 mounted on a stud 71 screwed into and depending from the framework 18 of the furnace or forehearth, supports the bus-bars so as to take the load from the bushing itself. Water cooling conduits 75 lead into the connector bars 61. Water circulating in the conduits serves to carry away the excess heat and maintain the proper temperature in the electrical connections.

In order to enable the bushing with the electrically heated metal liner to be readily installed in the opening 20 and at the same time form a contact with the bottom of the forehearth so as not to permit leakage or seepage, we have provided novel cooling means which freezes any glass which tends to seep through the contact but which does not interfere with the operation of the bushing or its electrical heating means, nor prevents the bushing from being readily removed. The marginal flange 36 on the metal liner extends outwardly from the trough 28 to a cooler zone and is juxtaposed to the under surface of the floor block 13. Fitting in the annular recess 29 of the refractory bushing and skirting the edge of the flange 36 or mounted directly underneath the edge and preferably not quite touching it, is a seamless copper tube 30, generally about ¼ inch in diameter and somewhat flattened to secure cooling over a greater area. An inlet and outlet to the tube is provided by bending the ends thereof downwardly and connecting the free ends 30a which project through the peripheral flange 31, to a source of cooling fluid supply and disposal outlet, respectively (not shown). The copper tube is preferably brazed at the bends in order to secure greater cooling at this point and so that the cooling is secured completely around the flange. By mounting the copper tubing underneath the flange rather than at the edge, a loss of seal is avoided when the flange buckles. Furthermore, this arrangement cools a greater portion of the flange. The copper tube 30 is embedded in a sillimanite or similar cement 32 which holds the unit together as a whole. This binding means may extend both over and underneath the marginal flange 36 to bind the same to the refractory blocks 26 and 27 and to form a coating over the flange.

An increase in the area of the marginal flange 36 provides a greater area for sealing against the flow block and permits a longer life of the block before leaking begins. This increase also permits mounting of the cooling tube below the flange. The addition of this metal does not appreciably alter the electric or mechanical characteristics of the bushings.

With this type of construction, comparatively little sillimanite cement is required. This is advantageous since there is less sillimanite present to break down, form a glass, travel between the refractory and alloy bushing and appear at the tips or nipples 42. By means of our novel arrangement of the water cooling at the places in the heated liner where heat is objectionable, leakage of molten glass is prevented without interfering with the normal operation of the electrical heating. This arrangement also lends itself to a very practical, continuous control of the temperature to make the various desired glass fibers.

Although the present invention has been illustrated and described in connection with specific embodiments thereof, it is to be understood that variations and modifications may be made without departing from the spirit of the invention as defined in the appended claims.

We claim:

1. A bushing for projecting a plurality of streams of molten glass from a furnace or the like, which comprises a refractory block having a V-shaped opening therethrough and a metal liner seated within said opening, said liner having a plurality of openings in the bottom thereof to permit the flow of molten glass therethrough, means for supplying electrical current through said liner, and means associated with said liner for regulating the electrical resistance thereof.

2. A bushing for projecting a plurality of streams of molten glass from a furnace or the like, which comprises a refractory block having a V-shaped opening therethrough and a metal liner seated within said opening, said liner having a plurality of openings in the bottom thereof to permit the flow of molten glass therethrough, means for supplying electrical current through said liner, and means associated with said liner to distribute said current to produce a predetermined temperature therein, said means including enlarged portions integral with the walls of said liner.

3. A bushing for projecting a plurality of fine streams of molten glass from a furnace or the like which comprises a converging trough having a series of outlets at the converging portion of said trough, means for electrically heating said trough and maintaining the glass emerging from said outlets at a high temperature, an outwardly disposed flange integral with the upper portion of said trough adapted to make an intimate contact with said furnace, and cooling means in the proximity of the periphery of said flange to prevent the premature wearing away of said furnace and to prevent the leakage or seepage of molten glass therethrough, said cooling means being sufficiently remote from said trough to prevent material cooling thereof.

4. A bushing for projecting a plurality of fine streams of molten glass from a furnace or the like which comprises a converging trough having a series of outlets at the converging portion of said trough, said outlets being provided with nipples protruding from said trough to prevent adjacent streams of glass from running together and coalescing, means for electrically heating said trough and maintaining the glass emerging from said outlets at a high temperature, an outwardly disposed flange integral with the upper portion of said trough adapted to make an intimate contact with said furnace, and cooling means in the proximity of the periphery of said flange to prevent the premature wearing away of said furnace and to prevent the leakage or seepage of molten glass therethrough, said cooling means being sufficiently remote from said trough to prevent material cooling thereof.

5. A bushing for projecting a plurality of fine streams of molten glass from a furnace or the like which comprises a converging trough having a series of outlets at the converging portion of said trough, said outlets being provided with nipples protruding from said trough to prevent adjacent streams of glass from running together and coalescing, outwardly disposed lugs integral with said trough to permit an electrical connection thereto with a source of electrical energy, and means associated with said trough to distribute electrical current therethrough to produce predetermined temperatures in said trough.

6. A bushing for projecting a plurality of fine streams of molten glass from a furnace or the like which comprises a converging trough having a series of outlets at the converging portion of said trough, said outlets being provided with nipples protruding from said trough to prevent adjacent streams of glass from running together and coalescing, outwardly disposed lugs integral with said trough to permit an electrical connection thereto with a source of electrical energy, means associated with said trough to distribute electrical current therethorugh to produce predetermined temperatures in said trough, said means including a series of integral ribs in said trough of electrical conducting material, said ribs extending from the ends of the trough toward the middle thereof and terminating short of the middle, and the ribs of each series each arranged one above another and of graduated lengths diminishing from the lowermost upward.

7. A bushing for projecting a plurality of fine streams of molten glass from a furnace or the like which comprises a converging trough having a series of outlets at the converging portion of said trough, an outwardly disposed flange integral with the upper portion of said trough adapted to make an intimate contact with said furnace, means for electrically heating said trough and maintaining the glass emerging from said outlets at a high temperature, cooling means in the proximity of the periphery of said flange to prevent the premature wearing away of said furnace and to prevent the leakage or seepage of molten glass therethrough, said cooling means being sufficiently remote from said trough to prevent material cooling thereof, and means associated with said trough to distribute electrical current therethrough to produce predetermined temperatures in said trough.

8. A bushing for projecting a plurality of fine streams of molten glass from a furnace or the like which comprises a converging trough having a series of outlets at the converging portion of said trough, means for electrically heating said trough and maintaining the glass emerging from said outlets at a high temperature, an outwardly disposed flange integral with the upper portion of said trough adapted to make an intimate contact with said furnace, cooling means in the proximity of the periphery of said flange to prevent the permature wearing away of said furnace and to prevent the leakage or seepage of molten glass therethrough, said cooling means being sufficiently remote from said trough to prevent material cooling thereof, and a screen covering said trough to prevent the influx of stones and other foreign matter.

9. A metal container for feeding a plurality of streams of molten glass at a predetermined temperature, said container comprising downwardly converging side walls terminating at their lower end in a series of outlets, means for the attachment of electrical connections to said container to pass electric current therethrough from a source of electrical energy, and means associated with said container to distribute electrical current therethrough at predetermined current densities in various areas to produce predetermined temperatures throughout said container.

10. A metal container for feeding a plurality of streams of viscous glass at a predetermined temperature, said container comprising side walls converging toward and terminating in a series of outlets, means for the attachment of electrical connections to said container for admitting an electrical current through said side walls, each said side wall being varied in thickness at predetermined areas thereof and to predetermined degrees, to thereby regulate the current density throughout the side walls and to distribute the current in a manner to produce predetermined temperatures at the said outlets.

11. The combination of a container for molten glass having a well extending through the floor thereof, a refractory bushing beneath the floor in register with said well, a sheet metal liner for said bushing comprising a flange interposed between the bushing and said floor, means for securing the bushing in position, means for heating the liner, and means for circulating a cooling medium around the bushing adjacent said flange and thereby causing a localized cooling by which leakage and seepage of molten glass between said floor and bushing are prevented and the flow of glass at the desired temperature through the bushing is not hindered.

12. In apparatus for making fibers from glass and like material, a container for the material, a sheet metal feeder associated with said container, said feeder being formed with a row of small outlet openings, through each of which a stream of the molten material is continuously discharged, means for passing an electric current through the feeder and thereby heating the walls of the feeder outlets, and means for directing the path of the electric current through the feeder and equalizing the temperature of the outlet walls to obtain an equal temperature of all the said streams at the outlets.

13. In apparatus for making fibers from glass and like material, a container for the material, a sheet metal feeder associated with said container, said feeder being formed with a row of small outlet openings, through each of which a stream of the molten material is continuously discharged, means for passing an electric current through the feeder and thereby heating the walls of the feeder outlets, and means for directing the path of the electric current through the feeder and equalizing the temperature of the outlet walls to obtain an equal temperature of all the said streams at the outlets, said temperature equalizing means comprising a series of ribs of electrically conducting material on the side walls of the feeder.

14. In apparatus for making fibers from glass and like material, a container for the material, a sheet metal feeder associated with said container, said feeder being formed with a row of small outlet openings, through each of which a stream of the molten material is continuously discharged, means for passing an electric current through the feeder and thereby heating the walls of the feeder outlets, and means for directing the path of the electric current through the feeder and equalizing the temperature of the outlet walls to obtain an equal temperature of all the said streams at the outlets, said temperature equalizing means comprising series of ribs of electrically conducting material on the side walls of the feeder, said ribs extending from the ends of the feeder walls toward the midde thereof and terminating short of the middle, the ribs of each series being arranged one above another and of graduated lengths diminishing from the lowermost upward.

15. A bushing for projecting a plurality of streams of molten glass, which comprises a refractory block formed in two sections and having a converging opening therethrough, a liner seated therein consisting of a material having higher electrical conductivity than that of the molten glass, said liner being formed with outlet openings through which streams of glass issue continuously, means for passing an electrical current through said liner and thereby maintaining the walls of the outlet openings at about the temperature of the glass flowing therethrough, the upper portion of said liner having an integral marginal flange extending outwardly over the upper portion of said block adapted to fit contiguously to the outer surface around an opening of said forehearth, and cooling means around the periphery of said marginal flange, said cooling means being sufficiently remote from said outlet openings to prevent material temperature disturbance therewith or an interference with said electrical heating.

JOHN H. THOMAS.
ED FLETCHER.